UNITED STATES PATENT OFFICE.

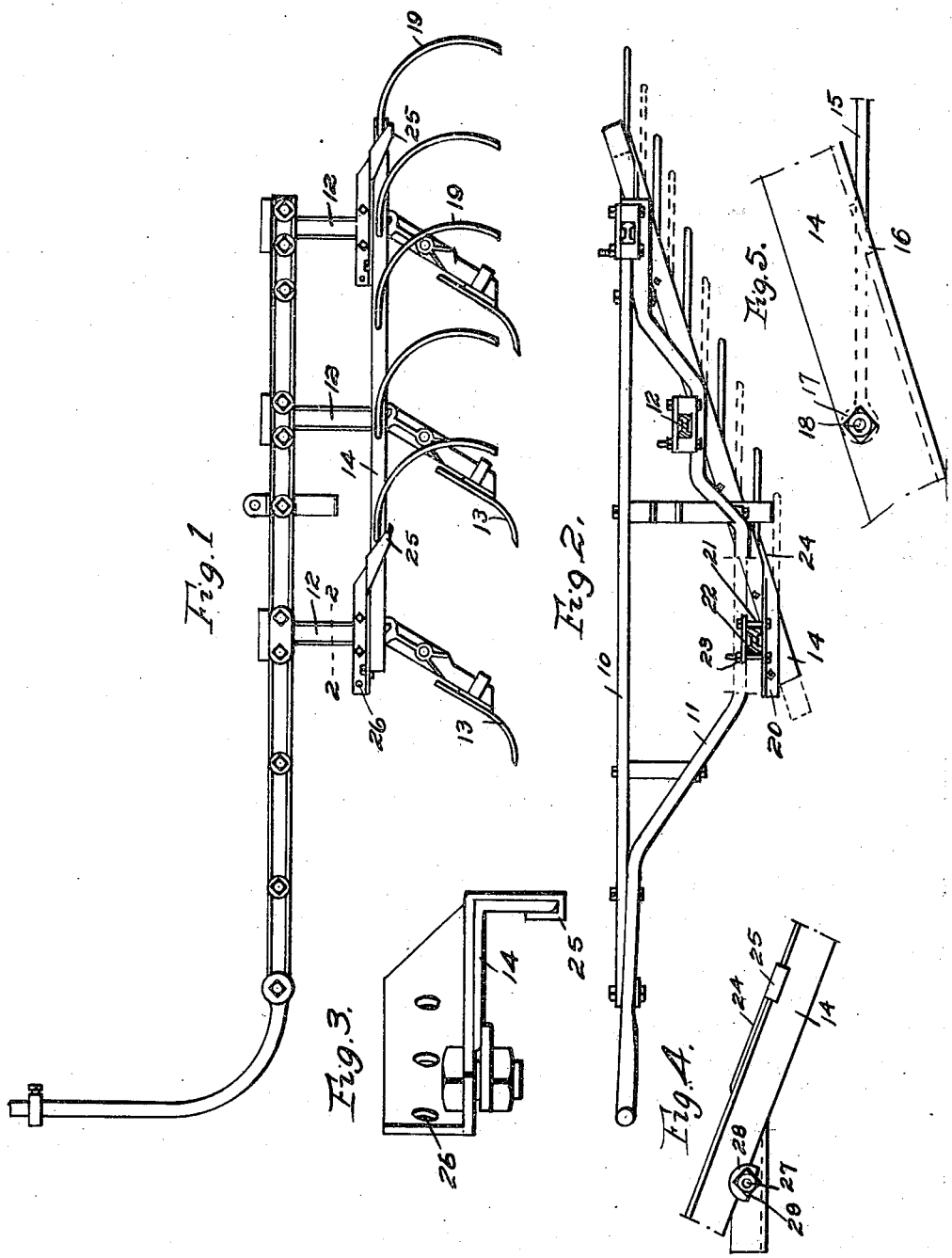

NATHAN C. PRALL, OF CARLISLE, IOWA.

CULTIVATOR ATTACHMENT.

1,251,821.      Specification of Letters Patent.      Patented Jan. 1, 1918.

Application filed May 7, 1917. Serial No. 167,117.

*To all whom it may concern:*

Be it known that I, NATHAN C. PRALL, a citizen of the United States, and resident of Carlisle, in the county of Warren and State of Iowa, have invented a certain new and useful Cultivator Attachment, of which the following is a specification.

The object of my invention is to provide an attachment for cultivators adapted to be mounted on ordinary cultivator shanks for use as a weeder and for certain purposes of cultivation, such as breaking up and pulverizing clods and serving as a harrow.

A further object is to provide such a device capable of adjustment to a variety of positions with relation to the cultivator.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a cultivator beam equipped with an attachment embodying my invention.

Fig. 2 shows a top or plan view of the same, part of one of the beam members being broken away and one of the shanks being shown in horizontal cross-section on the line 2—2 of Fig. 1.

Fig. 3 shows an end view of the attachment, the weeder teeth being omitted.

Fig. 4 shows an inverted plan view of one end of the attachment, and

Fig. 5 shows a detail view of part of the attachment.

In the accompanying drawings I have used the reference numerals 10 and 11 to indicate the members of a cultivator beam. Secured to the beam member 11 in the illustration shown, are three downwardly extending shanks 12. The lower ends of the shanks are inclined forwardly, as illustrated, and carry the cultivator shovels 13.

My improved attachment comprises an angle bar 14 having a horizontal flange and a downwardly extending flange.

A plurality of spring weeder teeth are provided, having substantially horizontal upper portions 15 extended through suitable openings in the downwardly extending flange, one of said openings being illustrated by dotted lines at 16 in Fig. 5. The forward ends of the portions 15 are provided with loops 17, as shown by dotted lines in Fig. 5, mounted on bolts 18 extended through the horizontal flanges of the angle iron 14.

At their rear ends the weeder members have downwardly curved portions 19. As will be seen, the portions 15 of the weeder members are inclined fore-and-aft in the machine, while the angle iron 14 is inclined diagonally across the machine adjacent to the shanks 12, as illustrated in Fig. 2.

For adjustably mounting the angle iron 14 on the shanks I have provided the following means:

Brackets 20 are provided in the form of angle bars having horizontal flanges resting on the horizontal flange of the angle iron 14, and vertical flanges in each case resting against one of the shanks 12, as best illustrated at the lower portion of Fig. 2.

Extending through the vertical flange of each bracket 20 are bolts 21 arranged on opposite sides of the adjacent shank and extended through a plate 22 adapted to fit against the shank, as shown in Fig. 2. Each bracket 20 has at its rear end a downwardly and rearwardly extending flange 24, inclined diagonally in the machine and adapted to engage the downwardly extending flange of the angle iron 14. At the lower rear end of each flange 24 is a portion 25 bent around the lower edge of the downwardly extending flange of the angle iron 14 to form an upwardly opening channel receiving said edge, as illustrated in Figs. 3 and 4.

I preferably provide in the upwardly extending flange of each bracket 20 a plurality of holes 26 for selectively receiving the bolts 21, whereby the brackets may be adjustably mounted on the shanks.

For firmly securing the brackets on the angle iron 14, there is provided at the forward end of each bracket a bolt 27 extending through the horizontal flange of the bracket and adjacent to the edge of the horizontal flange of the angle 14, as shown in Fig. 4. Mounted on the bolt 27 is a mutilated washer 28, one side of the washer being cut away so as to form quick and easy adjustment of the angle iron 14. By loosening the nuts 29 on the bolts 27 and turning the washers 28 until their mutilated sides register with the edges of the angle iron 14, the angle iron 14 may be easily slid longitudinally in the brackets.

When the nuts 29 are tightened, it will be seen that the angle iron 14 will be firmly gripped between the channel 25, the bolt 27 and washer 28 against the shanks 12.

It will, of course, be understood that I preferably provide one of the attachments for each side of the cultivator.

In the practical use of my improved device, it will be seen that the weeder members may be mounted to drag in the ridges formed at the sides of the paths of the cultivator shovels 13, and will tend to level the dirt to make a smooth, level field. The teeth 19 also tend to break up and pulverize the clods and make a fine dirt mulsh for growing plants. The cultivator shovels may be removed, if desired, for cultivating with the weeder device alone.

My improved attachment can be quickly and easily adjusted to a variety of positions. For instance, in Fig. 2 I have shown the attachment in full lines in one position, while in dotted lines I have shown the attachment in another position.

The attachment can be readily and quickly removed from its full-line position to its dotted-line position by loosening the nuts 29, giving to the washers 28 a half rotation, and then sliding the angle iron 14 longitudinally in the brackets. Thereupon the washers 28 may be given another half rotation, and the nuts screwed tight and the attachment will be ready for use.

The brackets 20 may also be adjusted in the machine by selectively mounting the bolts 21 in different holes 26. It is obvious that the brackets 20 may be easily adjusted vertically on the shanks 12.

Some changes may be made in the construction and arrangement of the parts of my improved attachment for cultivators, without departing from the essential features and purposes of my invention, and it is my intention to cover by my patent, any such changes or any use of mechanical equivalents which may be reasonably included within the scope of my claims.

I claim as my invention:

1. In a device of the class described, an angle iron bar, a plurality of weeder devices mounted thereon, a plurality of brackets for securing said bar to the shanks of a cultivator, each comprising an angle bar having one flange adapted to rest adjacent to one flange of said first named angle iron bar, and having a downwardly extending flange arranged to rest adjacent to the other flange of said first angle iron bar, and provided at its lower portion with a channel for receiving the edge of said last named flange, and a bolt extended through each of said brackets adjacent to one edge of said first angle iron bar.

2. In a device of the class described, an angle iron bar, a plurality of weeder devices mounted thereon, a plurality of brackets for securing said bar to the shanks of a cultivator, each comprising an angle bar having one flange adapted to rest adjacent to one flange of said first named angle iron bar, and having a downwardly extending flange arranged to rest adjacent to the other flange of said first angle iron bar, and provided at its lower portion with a channel for receiving the edge of said last named flange, and a bolt extended through each of said brackets adjacent to one edge of said first angle iron bar, a nut on said bolt, and a mutilated washer on said bolt, adapted to engage said first angle iron bar.

Des Moines, Iowa, April 30, 1917.

NATHAN C. PRALL.

Copies of this patent may be obtained for five cents each, by addressing the "Commissioner of Patents, Washington, D. C."